United States Patent [19]
Nugarus

[11] 3,981,233
[45] Sept. 21, 1976

[54] ANTI-STICK GRILL

[75] Inventor: Anthony R. Nugarus, Chicago, Ill.

[73] Assignee: Restaurant Technology, Inc., Oak Brook, Ill.

[22] Filed: Oct. 3, 1975

[21] Appl. No.: 619,297

[52] U.S. Cl. .............................. 99/422; 126/390; 219/459; 219/464; 220/64
[51] Int. Cl.² .......................................... A47J 37/06
[58] Field of Search ............... 99/422, 423–424, 99/425, 372; 126/390; 220/64; 219/443, 461–462, 457–458, 459, 464; 128/2 R

[56] References Cited
UNITED STATES PATENTS

| 2,040,102 | 5/1936 | Peron | 126/390 |
| 2,112,521 | 3/1938 | Cunningham | 126/390 |
| 2,526,687 | 10/1950 | Reams | 126/390 X |
| 3,473,952 | 10/1969 | McFadden | 220/64 X |
| 3,758,750 | 9/1973 | Van Toorn | 219/464 X |

FOREIGN PATENTS OR APPLICATIONS 274,407    4/1967    Australia ............................. 99/422

Primary Examiner—Stanley N. Gilreath
Assistant Examiner—Arthur O. Henderson
Attorney, Agent, or Firm—Dressler, Goldsmith, Clement, Gordon & Shore, Ltd.

[57] ABSTRACT

A grill for hamburgers and the like having a grilling surface comprising about 25% but no more than about 75% Teflon, with the remainder being metallic. The Teflon is provided in the form of discrete Teflon bodies disposed in recesses in the grill surface, each Teflon body being held by retention means. The foods to be grilled retain the characteristics of a grilled food, and the surface provides a grill surface with long-lasting anti-stick characteristics.

15 Claims, 9 Drawing Figures

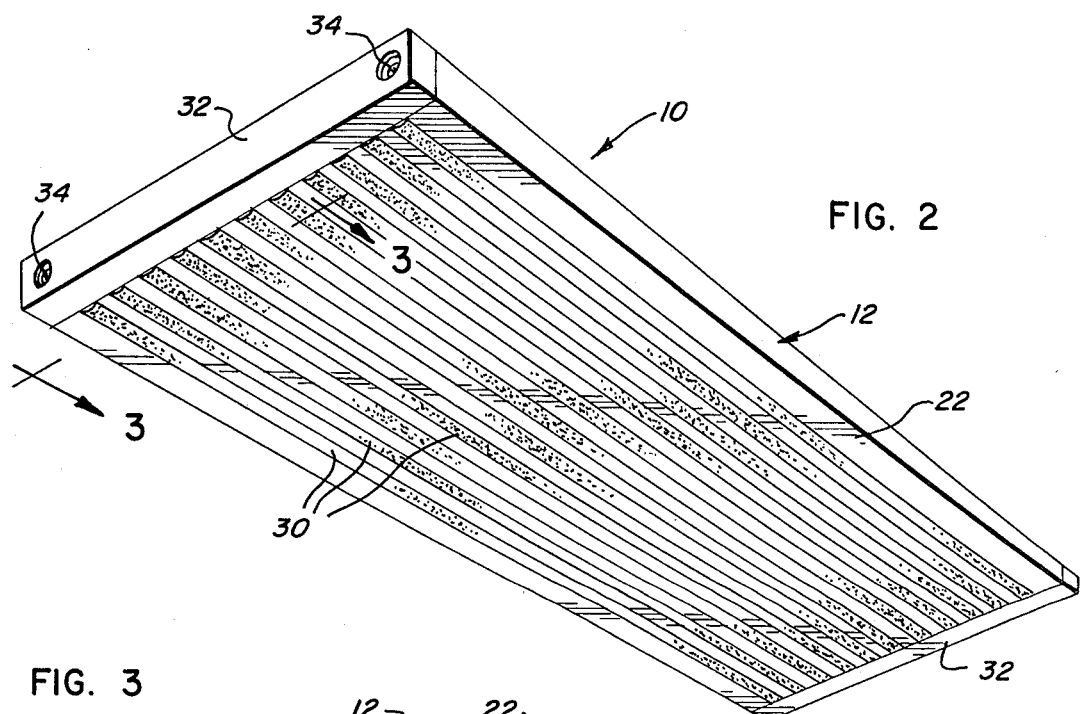
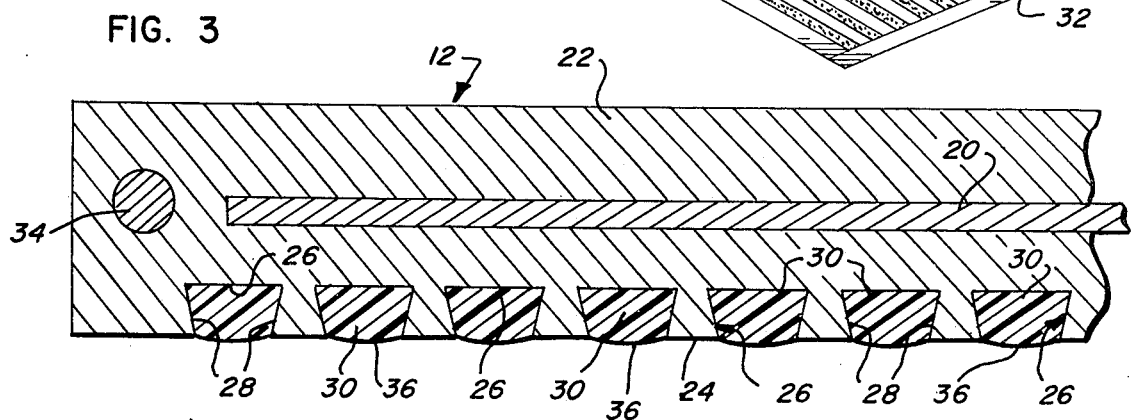

ANTI-STICK GRILL

This invention relates to an improved cooking surface which utilizes polytetrafluoroethylene, such as Teflon, to provide anti-stick characteristics, but which is long-lived and which does not adversely affect the characteristics of a product to be grilled so that the appearance, taste and characteristics of the grilled product are substantially the same as the same product grilled on a grilling surface which is solely metallic.

Many efforts have been directed toward the improvement of cooking and grill surfaces, and in particular of cooking surfaces which utilize polytetrafluoroethylene (hereafter referred to for convenience as TFE), all in an effort to provide the advantages of the known anti-stick characteristics of TFE on a long-term basis. However, for heavy duty commercial use, no successful grill surface has been developed, and for a variety of reasons. First of all, TFE layers which have been applied have had to be relatively thin so that they did not unduly insulate the product to be grilled from the heat source and so that they did not significantly change the appearance, taste and other characteristics of a product to be grilled. Further, effective adherence, long term, of TFE to a grill surface which operates for extended periods at 350° to 400°F. has been relatively difficult to achieve. Additionally, because TFE is not especially abrasion resistant, when a coated or laminated grill surface must be cleaned, as by scraping, the TFE is abraded and very quickly the TFE layer is effectively destroyed.

One approach to protecting a TFE grilling surface from being removed or destroyed by scraping or the like is shown in U.S. Pat. No. 3,493,726. However, a ridged surface of the type there shown is not practical for many commercial grill surfaces. Typical approaches to seeking to improve the surface characteristics of a metal cooking surface to which TFE is to be adhered, and which are intended to lessen the likelihood of delamination, are shown in U.S. Pat. Nos. 3,788,513; 3,593,703; 3,008,601; 3,495,735 and 3,241,545. U.S. Pat. No. 3,473,952 discloses the addition of glass beads or the like to a TFE coated material to enhance the durability and resistance to abrasion of TFE material. U.S. Pat. No. 2,534,407 contemplates another approach to providing a grill surface having improved greasing characteristics. That patent discloses a frying pan or the like having a network of very shallow grooves in which filling material may be disposed to provide a cooking surface which preferably will have improved greasing characteristics. It does not, however, contemplate the use of TFE.

Despite those efforts referred to and others seeking to make TFE usuable on commercial grill surfaces, thereby to obtain the advantages of its anti-stick characteristics for conventional grills, such as those used for cooking hamburgers and the like, and for platens, such as those which might be used to cook the upper surface of a hamburger as its lower surface is being cooked on a conventional grill, there is still no suitable, commercially available TFE grilling surface.

It is with a grilling surface which provides the anti-stick and release characteristics of TFE, which provides for very substantially enhanced durability of a TFE surface, and which retains adequate heat capacity for suitable searing and grilling, thereby to maintain the quality, taste and appearance of a grilled product, to which this invention is directed.

In accordance with this invention, improved grills are provided, which grills comprise a platen having a grilling surface and a heating means for heating the platen and the grilling surface. The grill may be portable or stationary.

A plurality of spaced recesses are provided in the grilling surface and these extend from the grilling surface inwardly toward the heating means and into the main body of the platen. Each recess has associated retention means. A discrete TFE body is disposed in each said spaced recess and is held in its associated recess by the retention means. Each body has a surface portion disposed at the grilling surface for contact with an object to be disposed against the grilling surface for grilling.

To enhance the abrasion resistance of the TFE, the bodies are desirably filled with up to about 25% glass fiber or carbon.

The recesses and associated retention means may be elongate and the TFE bodies may be of a complementary configuration, which configurations serve to restrain the bodies against removal from the recesses. The recesses and associated retention means may define a keyway configuration or a parti-spherical configuration. Desirably the TFE bodies are replaceable and to that end the platen may comprise a first main body portion defining a plurality of parallel recesses for retaining the TFE bodies and removable stop means bearing against ends of the TFE bodies for restraining their longitudinal movement while permitting their removal from the platen when the removable stop means is separated from the main body.

Alternatively the recesses may be generally cylindrical and may have associated retention means for restraining removal from the recesses.

The grilling surface is at least about 25% but no more than about 75% TFE and the TFE bodies are substantial, being at least ⅛ inch thick so that scraping or abrasion will not significantly affect or destroy the anti-stick characteristics.

Further objects, features and advantages of this invention will become apparent from the following description and drawings, of which:

FIG. 2 is a bottom perspective view of FIG. 1;

FIG. 3 is a cross-sectional view taken substantially along the line 3—3 of FIG. 2;

FIG. 4 is a bottom view of a further embodiment of a portable grill of this invention;

FIG. 5 is an enlarged cross-sectional view taken substantially along the line 5—5 of FIG. 4;

Figure 1:
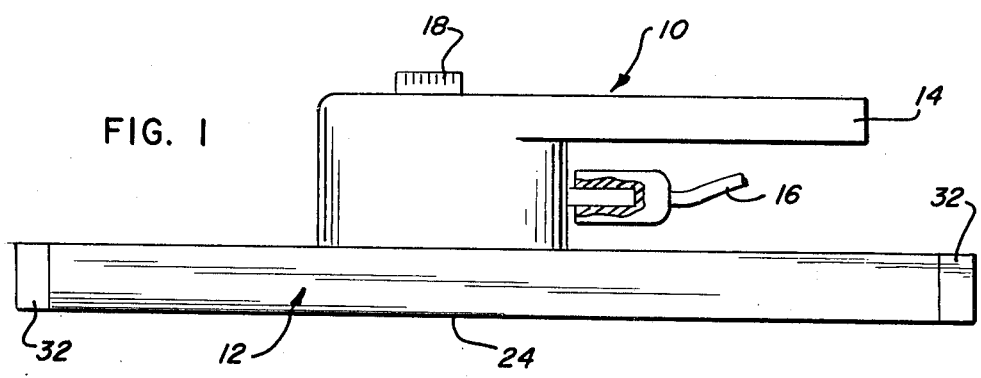
FIG. 1 is a side elevational view of a portable grill assembly according to this invention.

Referring first to FIGS. 1 to 3, a preferred grill in accordance with this invention comprises a portable grill assembly 10 comprising a platen 12 and a handle assembly 14. Platen 12 is electrically heated via a power cord 16. The temperature at which the grill assembly operates is variable and is under the control of a thermostat and a suitable temperature control knob 18. The platen is heated by the thermostatically controlled heating element 20 which may comprise a mica electric heating element.

The platen 12 comprises a main body portion 22 and provides a grilling surface 24. The grilling surface defines a plurality of spaced openings or recesses 26 which extend inwardly from grilling surface 24 into the main body 22 of the platen and toward the heating element 20. Each of the parallel recesses is suitably configured and shaped to provide associated retention means for TFE bodies. In the embodiment illustrated, and as best seen in FIG. 3, the recesses are generally trapezoidal in cross-section, thereby to define keyways, the inclined surfaces 28 of the recess providing, as will appear, the retention means for the complementarily shaped TFE bodies 30.

As seen in FIGS. 2 and 3, each recess and associated retention means is elongate and extends along the length of the main body 22. Each recess receives, holds and retains an associated TFE body 30 which defines a key-like configuration which is complementary to the shape and configuration of the associated recess. The TFE bodies in this embodiment may be Du Pont Teflon, Class A. Each TFE body 30 thereby is retained within its associated recess to prevent its movement away from the grilling surface 24. A preferred TFE body is normally about 3/16 inch in depth, is about 1/4 inch in width at its face and is about 5/16 inch in width at its base.

For assembly purposes and to provide for ease of replacement of the TFE bodies 30 as may be necessary or desirable from time to time, end closures or stops 32 are provided at each end of the main body 22 of the platen. The end closures are secured, as by fasteners or screws 34, to the main body 22, and provide surfaces against which the TFE bodies 30 may bear for restraining longitudinal movement of the TFE bodies when the portable grill assembly 10 is assembled and is in use. When it is desirable to remove one or more of the TFE bodies, it is only necessary then to remove the screws 34, thereby to remove a cap and to gain access to the TFE bodies for withdrawing them from their associated recesses. Substitute or replacement TFE bodies may then be slid inwardly from an end of the associated recesses and, after this, the end stop 32 may once again be secured to the main body portion 22 to ready the grill assembly 10 for use.

Although two end stops 32 have been shown, it is, of course, possible to provide an end stop at one end only. Further, the particular complementary configurations of the recess and TFE body for providing for retention may vary from the specific trapezoidal undercut recess configuration illustrated in FIG. 3.

It should also be noted that the TFE bodies 30 provide slightly outwardly extending and rounded or domed surfaces 36, thereby to enhance the release characteristics of the TFE bodies. Depending on the type of TFE used, the surface 36 will be substantially flat or slightly crowned. Although the TFE bodies may be solid, pre-formed shapes, they may also incorporate other filler materials, such as glass fiber and carbon, which enhance their durability, for example in amounts of up to about 25%.

The platen 12 itself may be formed in a variety of ways. To provide the recesses which receive the TFE bodies and the opening receiving the heating element 20, the main body portion 22 may be formed by casting or extruding aluminum. It is also possible to provide the recesses by milling a suitable solid platen blank. The main body portion may also be a multi-piece assembly which, when assembled, defines a suitable recess for the heating element 20. It will, therefore, be seen that there are a variety of ways of forming the recesses and the heater opening in the platen 12.

Referring now to FIGS. 4 and 5, a further embodiment of a portable grill is illustrated. The portable grill assembly 10' may be substantially identical to grill assembly 10 except for the shape and manner of formation of the recesses and associated retention means, and of the TFE bodies.

Platen 12' may initially be formed, as by extruding a main body portion 22' to define a suitable opening to receive a heating element 20. The main body portion 22' may then be suitably provided with a series of recesses or bores 40 which extend from the grilling surface 24' into the main body 22' of the platen and towards the heating element 20. These bores may be provided by drilling, as by drilling cylindrical holes 0.24 inch in diameter.

To provide appropriate recesses and associated retention means, each of the bores may then be peened, as with a peen approximately 5/16 inch in diameter, to provide the recesses and to form reduced diameter portions below the grill surfaces 24' which are suitably shaped to serve as retention means 42. Thereafter, molded TFE plugs or rod segments approximately 1/4 inch in diameter and about 3/16 inch long may be driven downwardly, as with a suitable fixture, into the recesses. The TFE is suitably resilient so that it will pass the retention means 42, but will re-expand into a recess to provide TFE bodies 30' which are retained within the associated bores by the retention means 42, thereby to prevent their movement away from the grilling surface 24'. The TFE bodies 30' are then sheared close to the surface 24'. Following heating of the platen, depending upon the TFE used, the generally flat outer surfaces of the TFE bodies 30' will assume either generally flat or somewhat spherical or slightly domed shapes and will protrude slightly above the surface 24' of the main body portion 22', such as up to about 1/64 inch. Preferably bodies 30' define a central venting channel 31' about 1/64 inch to about 1/32 inch in diameter.

Although end closures 32 are not necessary in this embodiment for retaining and assisting in removal of the TFE bodies, they do provide for access to, and do facilitate assembly of the heating means 20 into the grill assembly 10'.

Figure 6:
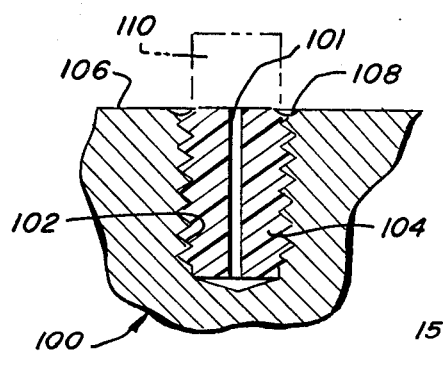
FIG. 6 illustrates a modification of the grill of FIGS. 4 and 5.

Referring now to FIG. 6, another embodiment similar to that of the embodiments of FIGS. 4 and 5 is illustrated. In this case, a platen 100 may be provided with suitably threaded bores 102. Molded TFE body elements 104 defining venting channels 103 like channels 31' are provided with complementary threads so that they may be screwed into bores 102. To assist in retention of the bodies 104, a high temperature sealant may be provided in the threaded area. Following the threading of the bodies 104 into the bores 102, an adjacent portion of the grilling surface 106 may be upset, as shown at 108, to extend inwardly of the recesses, thereby to restrain removal of the TFE bodies. To facilitate insertion of the TFE bodies, a square head portion 110 may be provided. Following the insertion of each TFE body, the head may be sheared from the TFE body portion to provide a surface configuration which, upon heating, is similar to the head configuration of FIG. 5.

Figure 7:
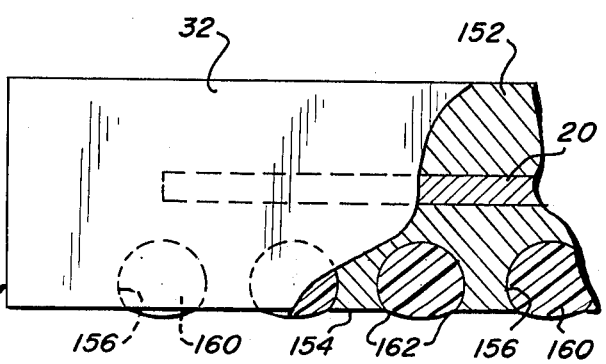
FIG. 7 illustrates a further embodiment of a portable grill of this invention.

Referring now to FIG. 7, in this embodiment, a platen 150 like that of FIGS. 1 to 3 comprises a main body portion 152 and a grilling surface 154. A heating element 20 is disposed in an opening for that purpose. The grilling surface defines a plurality of elongate recesses 156 which are parti-cylindrical in cross-sectional shape. Each recess is configured to receive, hold and retain an associated TFE body 160 which may initially be cylindrical in shape and from about 3/16 inch to about 5/16 inch in diameter, and which may then have a protruding portion cut and removed to provide a generally flat, but ultimately slightly domed surface configuration of the type shown in FIG. 3 and a depth then of at least about 1/8 inch to about 1/4 inch. The shape of the recesses 156 is such that the edge portions 162 serve as retention means for the TFE bodies to prevent their movement away from the grilling surface. An end stop 32 like that used in the embodiment of FIG. 3 may be used in the embodiment of FIG. 7.

The grill assemblies of the embodiments of FIGS. 1 to 7 have been described as being portable. They may be used in the general position illustrated in FIGS. 1 and 2, i.e., to grill an upper surface of a product to be grilled which may have its other, lower surface disposed against a conventional grill, thereby to cook from both sides at the same time, or it may be used to cook the lower surface of a product by positioning it with its grilling surface facing upwardly. The use of TFE bodies of the type illustrated is, however, also applicable to other grill surfaces, such as larger, expansive grills of the type conventionally encountered in restaurants at the present time. A grill of this character is illustrated in FIGS. 8 and 9.

Figure 9:
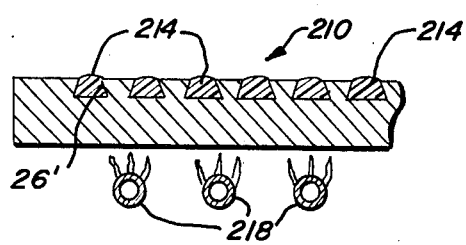
FIGS. 8 and 9 schematically illustrate yet another embodiment of this invention.
Figure 8:
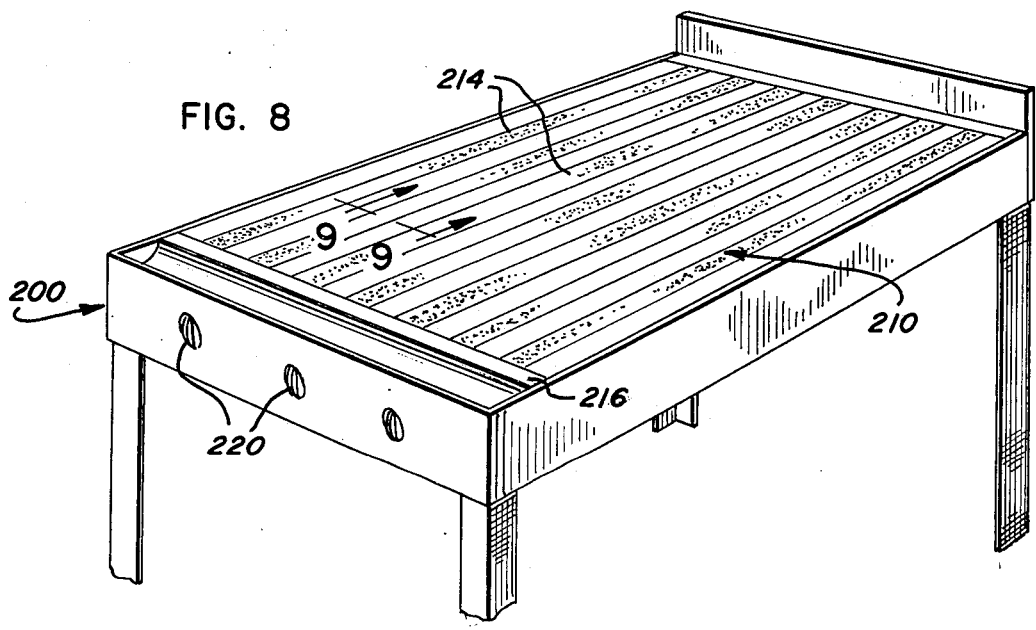

As shown in FIGS. 8 and 9, a grill 200 includes a suitable frame and support legs and a grill surface 210. Grill surface 210 comprises an upper cooking surface which may define a series of elongate recesses 26' like those of the embodiment of FIGS. 1 to 3. These recesses 26' suitably receive and mount elongate TFE bodies 214 which may be shaped like those of FIG. 3. A front stop 216 is provided for restraining longitudinal movement of the TFE bodies 214, thereby to keep them in position within the recesses 26'.

The grill surface 210 may be heated in any suitable or known manner, such as by gas burners 218 which are under the control of suitable thermostats (not shown) and gas control knobs 220.

Grill 200 may then be used as a conventional, fully metallic grill would be used, with, however, the anti-stick advantages of the TFE bodies and without concern that the TFE surface will require constant repair.

Depending upon the particular heating means used and the amount of heat removed by the maximum anticipated amount of product to be cooked or grilled at a given time, the ratio of metallic cooking surface to TFE face surface may vary in the several embodiments illustrated. It is, of course, important when the product is to have a grilled appearance that there be sufficient metallic surface contacting the product so that the finished product will have a typical grilled product appearance. It has been determined, depending again upon the heating element used, that the TFE face area should be at least about 25% but no more than about 75% of the surface area both to achieve proper cooking and product characteristics and to enable the TFE to provide its proper anti-stick and release characteristics for the product to be cooked. The width or size of the faces of the TFE bodies may vary and the number of bodies will also be a function of practical considerations. Of course, the less bodies, the less the expense of making the grill surface and platen.

In the embodiment of FIGS. 1 to 3, for example, the width of the TFE body surface may typically be 1/4 inch with the width of the bridging metal cooking surface being approximately 3/16 inch. This provides a metallic cooking surface of approximately 43% which has been determined to be sufficient in terms of cooking a product such as a hamburger so that it had the typical grilled surface characteristics and taste, while providing superior anti-stick characteristics when the hamburger was cooked at a cooking surface temperature range of about 350° to about 400° F. The embodiment of FIGS. 4 and 5 shows the recesses to be in regular rows and columns, and with the recesses being approximately 1/4 inch in diameter and on about 11/16 inch centers. However, the recesses may be located in staggered patterns as well, with recess sizes ranging from 1/4 inch to 5/16 inch, with the recesses being closer together because of the staggered pattern and with the grilling surface ranging from at least about 25% but no more than about 75% TFE.

In all cases the thickness of the TFE bodies is substantial, i.e., in the order of at least about 1/8 inch, so that abrasion or scoring will not be likely to destroy or seriously affect the anti-stick characteristics of the grilling surface.

From the foregoing description it will be clear to those skilled in the art that modifications and alternatives to the specific embodiments disclosed may be employed, all without departing from the spirit and scope of this invention. Accordingly, I do not intend to be limited, except insofar as may be required by the appended claims.

I claim:

1. A grill, comprising a platen having a grilling surface, a heating means for heating said platen and said grilling surface, a plurality of spaced recesses in said grilling surface and extending inwardly toward said heating means and into the main body of said platen, each said recess having associated retention means, a discrete polytetrafluoroethylene body in each said spaced recess and held in its recess by said retention means and having a surface portion disposed at said grilling surface for contact with an object to be disposed against said grilling surface for grilling.

2. A grill according to claim 1 in which said bodies are filled bodies.

3. A grill according to claim 2 in which said bodies are filled with up to about 25% of one of glass beads and carbon.

4. A grill according to claim 1 in which said bodies are elongate and said recesses and associated retention means are elongate and parallel and are of a configuration complementary to said bodies, thereby to restrain said bodies against removal from said recesses.

5. A grill according to claim 4 wherein each said body defines a key configuration and each said recess and retention means defines a complementary keyway configuration.

6. A grill according to claim 4 in which said recesses are parti-cylindrical in cross-section and said retention means comprises edge portions of said recesses adjacent said grilling surface, said bodies being generally rod-like in configuration and being restrained against removal by said edge portions.

7. A grill according to claim 4 in which said bodies are replaceable, said platen comprises a first main body portion defining said recesses and retaining said bodies, and removable stop means bearing against ends of said bodies for restraining their longitudinal movement but for permitting their removal from said platen when said removable stop means is separated from said main body portion.

8. A grill according to claim 1 in which said recesses are generally cylindrical bores extending inwardly from said grilling surface.

9. A grill in accordance with claim 1 in which said grilling surface comprises at least about 25% but no more than about 75% polytetrafluoroethylene, with the remainder being metallic.

10. A grill according to claim 1 in which each said body defines a slightly domed surface at said grilling surface.

11. A grill for grilling foods such as hamburgers and the like, comprising a grilling platen having a main body portion providing a grilling surface and a heating means for heating said platen and said grilling surface, a plurality of elongate, parallel spaced recesses in said grilling surface and extending from said grilling surface inwardly toward said heating means and into said main body portion, each said recess having associated retention means, a discrete removable polytetrafluoroethylene body in each said spaced recess and being complementary in configuration thereto and held in its recess by said retention means and having a surface portion disposed at said grilling surface for contact with food to be disposed against said grilling surface for grilling, and removable stop means bearing against ends of said bodies for restraining their longitudinal movement but for permitting their removal from said platen when said removable stop means is separated from said main body portion, said grilling surface comprising from at least about 25% but no more than about 75% polytetrafluoroethylene with the remainder being metallic.

12. A grill according to claim 11 in which said bodies are filled bodies.

13. A grill according to claim 11 wherein each said body defines a key configuration and each said recess and retention means defines a complementary keyway configuration.

14. A grill according to claim 11 in which said recesses are generally cylindrical bores extending inwardly from said grilling surface.

15. A grill according to claim 11 in which each said body defines a slightly domed surface at said grilling surface.

* * * * *